US010328544B2

(12) United States Patent
Sun et al.

(10) Patent No.: US 10,328,544 B2
(45) Date of Patent: Jun. 25, 2019

(54) SCROLL MACHINING METHOD AND SCROLL MACHINING APPARATUS (71) Applicant: Danfoss (Tianjin) Ltd., Tianjin (CN)

(72) Inventors: Yusong Sun, Tianjin (CN); Mickael Bron, Tianjin (CN); Chengshui Huang, Tianjin (CN); Xishuang Zhang, Tianjin (CN)

(73) Assignee: Danfoss (Tianjin) Ltd., Tianjin (CN)

( * ) Notice: Subject to any disclaimer, the term of this patent is extended or adjusted under 35 U.S.C. 154(b) by 131 days.

(21) Appl. No.: 15/236,873

(22) Filed: Aug. 15, 2016

(65) Prior Publication Data
US 2017/0043446 A1 Feb. 16, 2017

(30) Foreign Application Priority Data

Aug. 14, 2015 (CN) .......................... 2015 1 0502262

(51) Int. Cl.
*B24B 19/14* (2006.01)
*B23B 5/46* (2006.01)
*F04C 18/02* (2006.01)

(52) U.S. Cl.
CPC ............... *B24B 19/14* (2013.01); *B23B 5/46* (2013.01); *F04C 18/0246* (2013.01); *F04C 18/0215* (2013.01); *F04C 2230/10* (2013.01)

(58) Field of Classification Search
CPC . B24B 19/14; B23B 5/46; F04C 29/00; F04C 18/0215
See application file for complete search history.

(56) References Cited

U.S. PATENT DOCUMENTS

| 7,052,370 | B2* | 5/2006 | Nakasuji ................ B23Q 17/22 451/10 |
| 7,293,945 | B2 | 11/2007 | Matsuhashi et al. | |
| 2002/0148592 | A1 | 10/2002 | Mori et al. | |
| 2006/0066664 | A1 | 3/2006 | Kachi et al. | |
| 2006/0159580 | A1* | 7/2006 | Matsuhashi .............. B23D 5/02 418/55.2 |

FOREIGN PATENT DOCUMENTS

| CN | 85104676 A | 5/1986 |
| CN | 1046025 A | 10/1990 |
| CN | 1074276 A | 7/1993 |
| CN | 1550277 A | 12/2004 |
| CN | 1802508 A | 7/2006 |
| CN | 103926878 A | 7/2014 |

* cited by examiner

*Primary Examiner* — Moshe Wilensky
(74) *Attorney, Agent, or Firm* — McCormick, Paulding & Huber LLP (57) ABSTRACT In a scroll machining method, a scroll has a disc-like end plate and a scroll wall extending from a first side surface of the disc-like end plate, and the scroll is driven to rotate around a center axis C of the scroll, and a first cutter machines a side wall surface of the scroll wall while the scroll is rotating. The first cutter is a non-rotary cutter. When the scroll is machined, the scroll rotates around its center axis, and the first cutter does not rotate around its axis, thereby improving the scroll's machining precision and machining efficiency.

21 Claims, 13 Drawing Sheets

SCROLL MACHINING METHOD AND SCROLL MACHINING APPARATUS

CROSS REFERENCE TO RELATED APPLICATION

Applicant hereby claims foreign priority benefits under U.S.C. § 119 from Chinese Patent Application No. 201510502262.2 filed on Aug. 14, 2015, the content of which is incorporated by reference herein.

FIELD OF THE INVENTION

The present invention relates to the technical field of air conditioning, in particular to a scroll machining method and a scroll machining apparatus.

BACKGROUND

In the refrigeration and air conditioning industry, a compressor is one of important elements of a refrigeration and air conditioning system, and a scroll compressor is a widely-used compressor. A typical scroll compressor has a pair of scrolls capable of moving with reference to each other. When the scroll compressor is running, a scroll (orbiting scroll) of the scroll compressor orbits relatively to the other scroll (fixed scroll) so that a volume of a gas compression cavity between scroll walls is reduced, thereby compressing gas. Finally, the compressed gas is discharged from a discharge hole at the fixed scroll.

Generally, milling is adopted to machine a scroll. In a whole machining process, the scroll to be machined keeps stationary, and a milling cutter is rotated in order to machine a side wall surface and an end surface of the scroll wall of the scroll. However, such machining method has low machining precision, long machining period and low efficiency.

In addition, since the milling cutter for machining the scroll wall need meet a specific hardness requirement, the milling cutter not satisfying the hardness requirement need be replaced, and a machining cost is thus increased.

SUMMARY

An objective of the present invention is to solve at least one aspect of the problems and defects in prior art.

According to an aspect of the present invention, in a scroll machining method, a scroll has a disc-like end plate and a scroll wall extending from a first side surface of the disc-like end plate, the method includes steps of: machining a side wall surface of the scroll wall by a first cutter when the scroll is driven to rotate around a center axis of the scroll, the first cutter being a non-rotary cutter.

According to an exemplary embodiment of the present invention, the first cutter moves along a first direction parallel with the center axis and along a second direction vertical to the first direction and pointing to the center axis.

According to another exemplary embodiment of the present invention, the scroll is clamped on a clamp and is driven to rotate by rotation of the clamp.

According to another exemplary embodiment of the present invention, the scroll is a fixed scroll.

According to another exemplary embodiment of the present invention, the clamp clamps a peripheral surface of the disc-like end plate of the fixed scroll.

According to another exemplary embodiment of the present invention, the scroll is an orbiting scroll and the orbiting scroll further includes a hub part extending from a second side surface of the disc-like end plate.

According to another exemplary embodiment of the present invention, the clamp clamps the hub part of the orbiting scroll.

According to another exemplary embodiment of the present invention, the first cutter has one blade.

According to another exemplary embodiment of the present invention, the first cutter has a pair of blades which are arranged in a back-to-back manner.

According to another exemplary embodiment of the present invention, side wall surfaces of the scroll wall are simultaneously machined by the pair of blades when the scroll wall of the scroll is machined, the side wall surfaces are surfaces facing each other in the scroll.

According to another exemplary embodiment of the present invention, the first cutter has a pair of blades facing each other.

According to another exemplary embodiment of the present invention, two side wall surfaces of the same scroll wall are machined simultaneously by the pair of blades.

According to another exemplary embodiment of the present invention, an end surface of the scroll wall and a first side surface of the disc-like end plate of the scroll while rotating the scroll are machined by a second cutter after the machining of the side wall surface of the scroll wall is finished.

According to another exemplary embodiment of the present invention, the second cutter moves along a first direction parallel with the center axis and a second direction vertical to the first direction and pointing to the center axis.

According to another exemplary embodiment of the present invention, the first cutter may be a turning cutter.

According to another exemplary embodiment of the present invention, the second cutter may be a turning cutter or milling cutter.

According to another exemplary embodiment of the present invention, the scroll is a fixed scroll; after the machining of the end surface of the scroll wall is finished, a second side surface of the disc-like end plate is machined by a third cutter while the scroll is rotating.

According to another exemplary embodiment of the present invention, the third cutter moves along a second direction vertical to the first direction and pointing to the center axis.

According to another exemplary embodiment of the present invention, the scroll is an orbiting scroll and the orbiting scroll further includes a hub part extending from the second side surface of the disc-like end plate; the second side surface of the disc-like end plate and a peripheral surface of the hub part are machined by a third cutter while the scroll is rotating.

According to another exemplary embodiment of the present invention, the third cutter moves along a second direction vertical to the first direction and pointing to the center axis.

According to another exemplary embodiment of the present invention, the third cutter may be a turning cutter.

According to another exemplary embodiment of the present invention, the scroll is mounted and fixed on a same clamp always during a whole process of machining the scroll.

According to another aspect of the present invention, a scroll machining apparatus includes a clamp, a first cutter and a control unit. The clamp is operable for fixing the scroll which to be machined and operable for driving the scroll to rotate around a center axis of the scroll, wherein the scroll has a disc-like end plate and a scroll wall extending from a first side surface of the disc-like end plate. The first cutter is operable for machining the side wall surface of the scroll wall while the scroll rotates. The first cutter is a non-rotary cutter. The control unit is operable for controlling the first cutter to machine the side wall surface of the scroll wall of the scroll.

According to another exemplary embodiment of the present invention, the scroll machining apparatus may further include a second cutter. The second cutter is operable for machining an end surface of the scroll wall and the first side surface of the scroll while the scroll rotates; the control unit is operable for switching the first cutter to the second cutter and controlling the second cutter to machine the end surface of the scroll wall and the first side surface of the scroll.

According to another exemplary embodiment of the present invention, the scroll machining apparatus may further a third cutter. The third cutter is operable for machining a second side surface of the disc-like end plate of the scroll and/or a peripheral surface of the hub part. The control unit is operable for switching the second cutter to the third cutter, and controlling the third cutter to machine the second side surface of the disc-like end plate of the scroll and/or the peripheral surface of the hub part.

According to another exemplary embodiment of the present invention, the scroll machining apparatus may be a numerical control machine tool.

In respective exemplary embodiments of the present invention, when the scroll is machined, the scroll rotates around its center axis, and a machining cutter (such as the first cutter) does not rotate around its axes, therefore, a machining precision and machining efficiency for the scroll are improved. In addition, in some embodiments of the present invention, the machining cutter may be a turning cutter, and a cutter bit of the turning cutter may be a standard blade. Therefore, the machining cutter can be updated by replacing the blade of the turning cutter, thereby reducing manufacturing costs.

The present invention will be described in more detail through the description hereinafter with reference to the drawings.

DETAILED DESCRIPTION

The technical solutions of the present invention are further described by embodiments in combination with drawings. In the specification, same or similar drawing numbers indicate same or similar parts. Description on implementation solutions of the present invention with reference to the drawings aims to explain concepts of the present invention should not be understood as limitation to the present invention.

The disclosed embodiments are described in detail in the description hereinafter. However, it should be noted that one or more embodiments can be implemented without all specific details. Some structures and apparatuses are shown in a schematic way in order to brief the drawings.

An embodiment of the present invention provides a scroll machining method. A scroll has a disc-like end plate and a scroll wall extending from a first side surface of the disc-like end plate. The method includes following steps: driving a scroll to rotate around its center axis, and machining a side wall surface of the scroll wall by using a first cutter while the scroll is rotating, the first cutter is a non-rotary cutter.

When the scroll rotates, the scroll rotates around a center axis of the scroll while a machining cutter does not rotate around an axis of the machining cutter.

In addition, it should be noted that in some embodiments of the present invention, the fixed scroll can be machined before or after the orbiting scroll, or the fixed scroll and the orbiting scroll can be machined simultaneously.

Embodiments Related to Machining a Fixed Scroll

Figure 1:
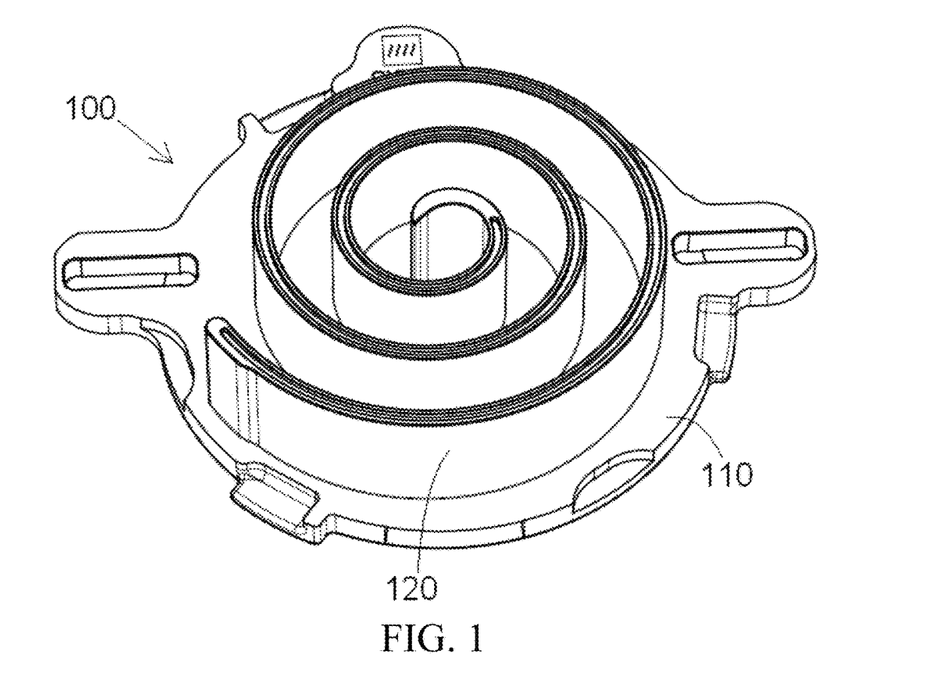
FIG. 1 is a three-dimensional schematic diagram of a fixed scroll according to an exemplary embodiment of the present invention.
Figure 2:
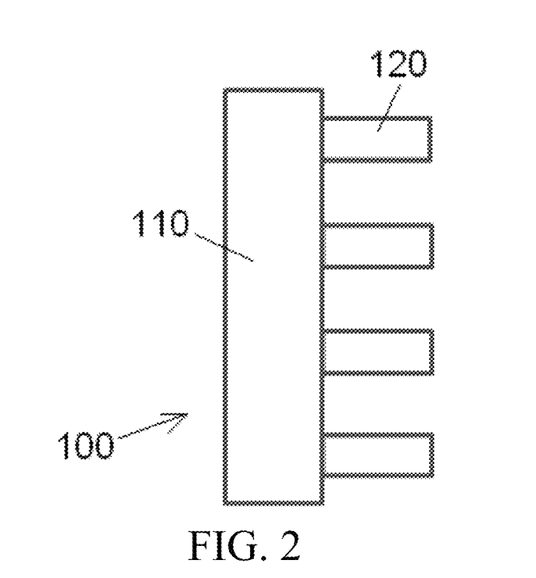
FIG. 2 is a schematic side view of the fixed scroll as shown in FIG. 1.

FIG. 1 is a schematic diagram of three-dimensional view of a fixed scroll 100 according to an exemplary embodiment of the present invention; and FIG. 2 is a schematic side view of the fixed scroll 100 as shown in FIG. 1.

As shown in FIG. 1 and FIG. 2, in the schematic embodiments, the fixed scroll 100 has a disc-like end plate 110 and a scroll wall 120 extending from a first side surface of the disc-like end plate.

A process for machining the fixed scroll 100 is described in detail with reference to FIGS. 1-8.

As shown in FIG. 1 and FIG. 2, the fixed scroll 100 is a workpiece to be machined.

Figure 3:
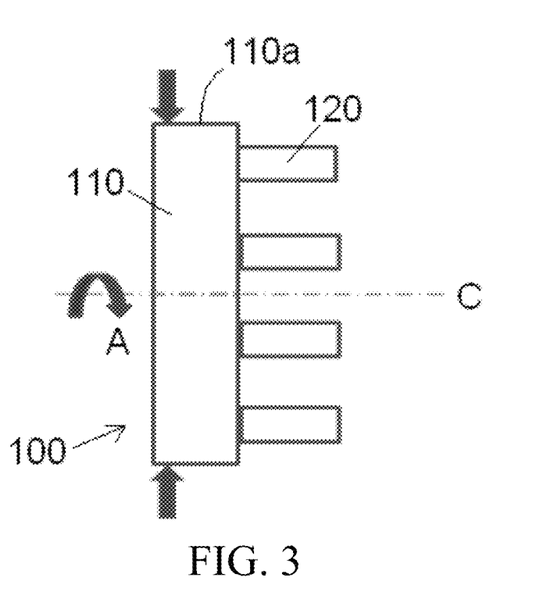
FIG. 3 is a schematic diagram of the fixed scroll as shown in FIG. 2 which is clamped by a clamp and which is driven to rotate.

As shown in FIG. 3, a clamp (not shown in FIG. 3) is used for clamping the fixed scroll 100. In an embodiment, the clamp can directly clamp a peripheral surface of the disc-like end plate of the fixed scroll 100. Thus, as shown in FIG. 3, the fixed scroll 100 may be driven by the clamp to rotate around its center axis C.

Other clamping manners may be adopted to clamp the fixed scroll besides the way of clamping an outer diameter of the fixed scroll shown in FIG. 3, for example, the fixed scroll may be clamped by an inner support part or by jaws.

Figure 4:
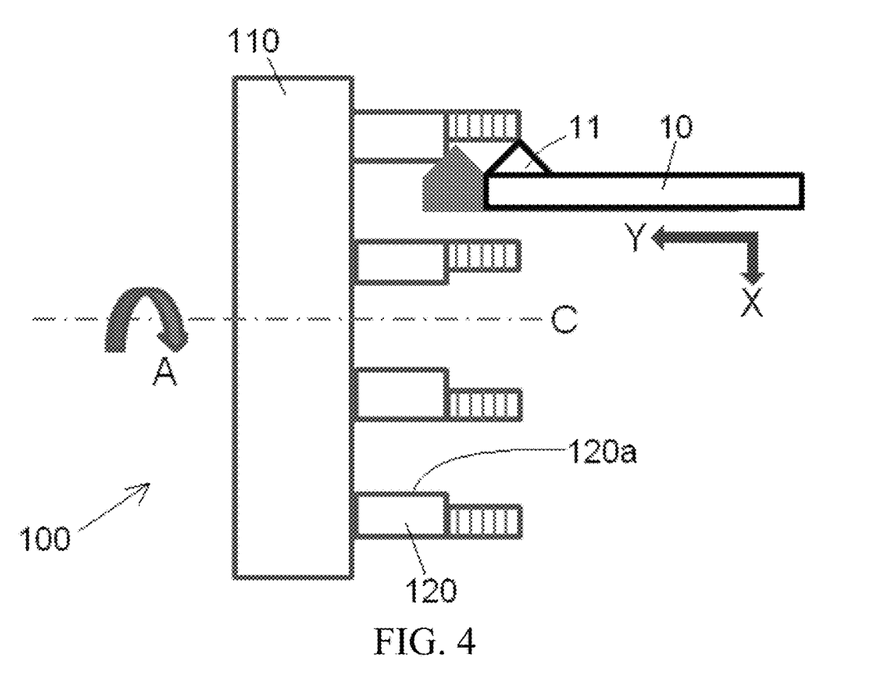
FIG. 4 is a schematic diagram illustrating machining a side wall surface of a scroll wall of a fixed scroll by using a first cutter while the fixed scroll rotates.

As shown in FIG. 4, while the fixed scroll 100 is rotating, a first cutter 10 machines a side wall surface 120a of a scroll wall 120 of the fixed scroll 100. When machining the side wall surface 120a of the scroll wall 120, the first cutter 10 moves along a first direction Y which is in parallel with the center axis C and along a second direction X which is vertical to the first direction Y and which is pointing to the center axis C. Specifically, the first cutter 10 moves forward a certain distance along the first direction Y each time when turning one circle along the scroll side wall in order to turn the next layer of the side wall surface 120a.

Figure 7:
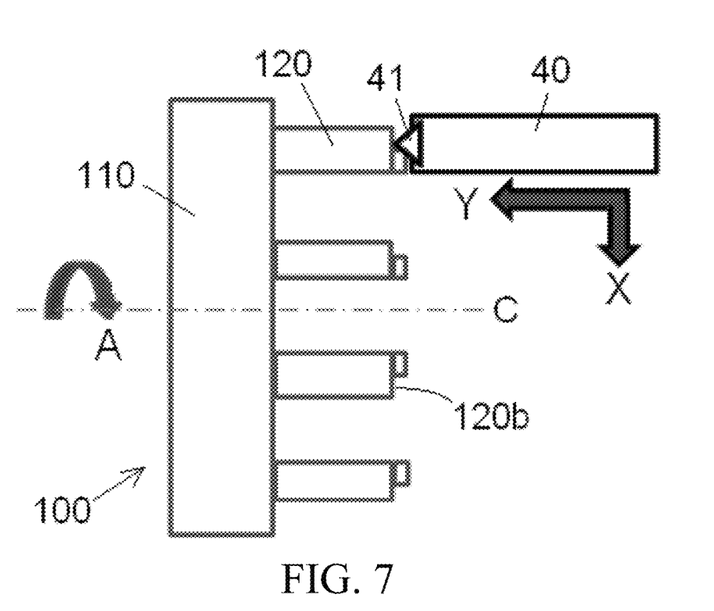
FIG. 7 is a schematic diagram illustrating machining an end surface of a scroll wall of a fixed scroll by using a second cutter.

As shown in FIG. 7, when the fixed scroll 100 is rotating, a second cutter 40 machines an end surface 120b of the scroll wall 120 and/or a first side surface of the disc-like end plate 110 of the scroll. When machining the end surface 120b of the scroll wall 120 and/or the first side surface of the disc-like end plate 110 of the scroll, the second cutter 40 moves along a first direction Y parallel with the center axis C and a second direction X vertical to the first direction Y and pointing to the center axis C.

Figure 8:
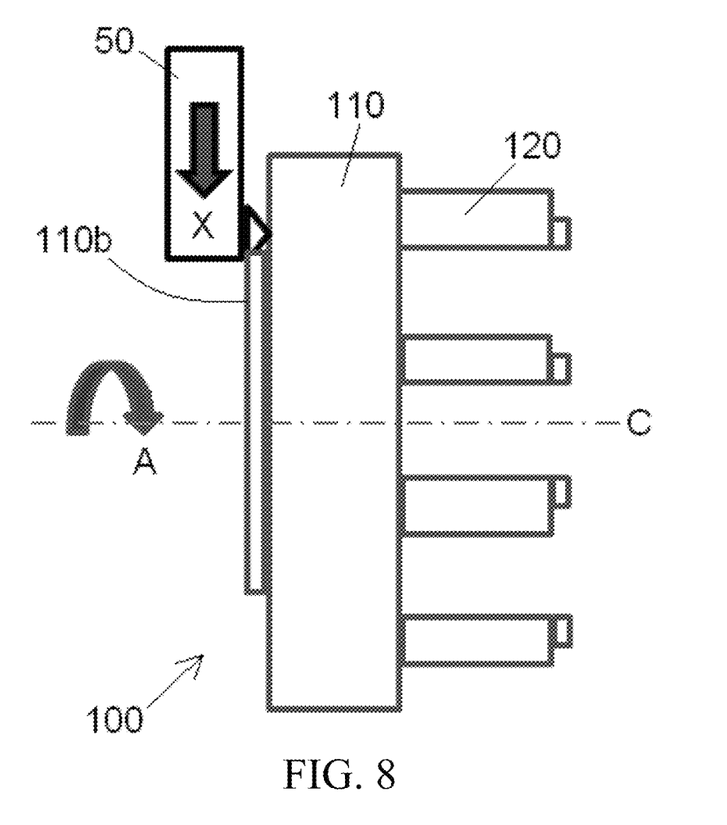
FIG. 8 is a schematic diagram illustrating machining a back surface of a disc-like end plate of a fixed scroll by using a third cutter.

Finally, as shown in FIG. 8, when the fixed scroll 100 is rotating, a third cutter 50 machines a second side surface 110b of the disc-like end plate 110. When machining the second side surface 110b of the disc-like end plate 110, the third cutter 50 moves along a second direction X vertical to a first direction Y and pointing to the center axis C.

As shown in FIG. 4, in the schematic foregoing embodiment, the first cutter 10 only has one blade 11. However, the present invention is not limited to the foregoing embodiment.

Figure 5:
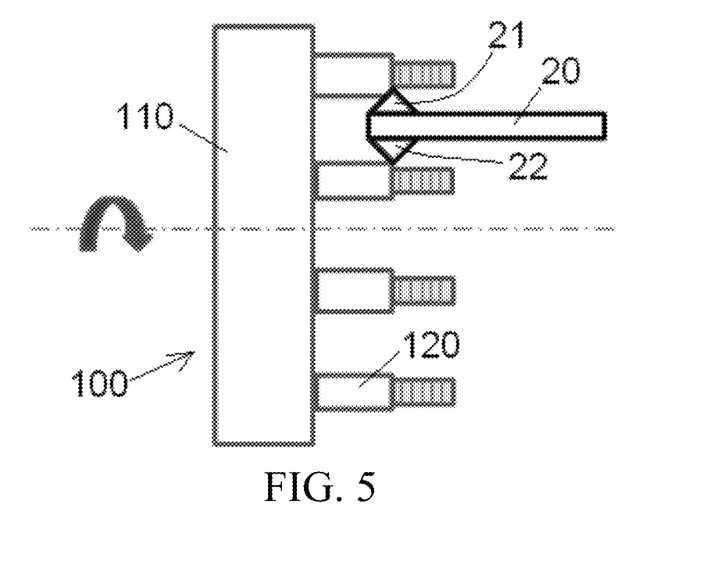
FIG. 5 is a schematic diagram illustrating machining a side wall surface of a scroll wall of a fixed scroll by using a variant of a first cutter while the fixed scroll rotates.

FIG. 5 shows a variant of a first cutter, a first cutter 20. As shown in FIG. 5, the first cutter 20 has a pair of blades 21 and 22, which are arranged in a back-to-back manner. Thus, opposite side wall surfaces 120a of the scroll wall 120 can be simultaneously machined by the pair of blades 21 and 22, thereby improving machining efficiency.

Figure 6:
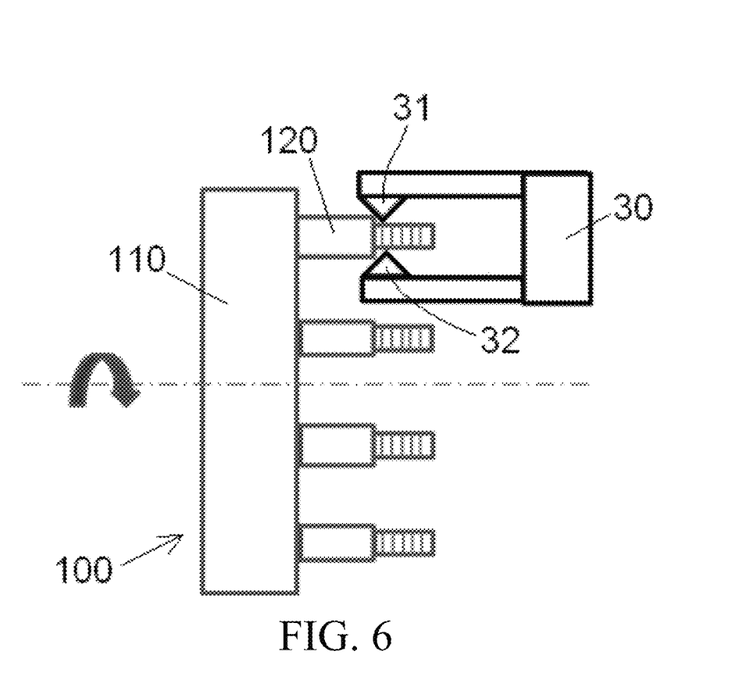
FIG. 6 is a schematic diagram illustrating machining a side wall surface of a scroll wall of a fixed scroll by using another variant of a first cutter while the fixed scroll rotates.

FIG. 6 shows another variant of a first cutter, a first cutter 30. As shown in FIG. 6, the first cutter 30 has a pair of blades 31 and 32 facing each other. Thus, the pair of blades 31 and 32 can simultaneously machine two side wall surfaces 120a of the same scroll wall 120, thereby improving the machining efficiency.

In an embodiment of the present invention, the foregoing first cutters 10, 20 and 30 may be a turning cutter with a standard cutter bit.

In an embodiment of the present invention, the second cutter 40 may be a turning cutter or milling cutter.

In an embodiment of the present invention, the third cutter 50 may a turning cutter and may be a cutter with a different shape or structure from the first cutters 10, 20 and 30.

In an embodiment of the present invention, in a whole process of machining the fixed scroll 100, the fixed scroll 100 is always mounted and fixed on the same clamp. Therefore, in the whole machining process, it is not necessary to mount and fix the scroll 100 again and again, while only the machining cutters need be replaced and moved, thereby further improving the machining efficiency.

In an embodiment of the present invention, a numerical control machine tool may be adopted in the machining of the fixed scroll 100, thereby further improving a machining precision and the machining efficiency.

In foregoing embodiments, the scroll is driven by the clamp to rotate around its center axis while the first cutter 10 does not rotate around its axis in a scroll machining process, that is, in each embodiment of the present invention, the first cutter 10 is a non-rotary cutter.

In addition, in the schematic embodiment, the first cutter 10 does not rotate around a center axis C of the scroll 100, thus simplifying the control of the first cutter 10 and improving the machining precision and machining efficiency.

In foregoing embodiments of the present invention, the first cutter 10 firstly machines the side wall surface 120a of the scroll wall 120 of the scroll 100, then the second cutter 40 machines the end surface 120b of the scroll wall 120 of the scroll 100 and/or a first side surface of the disc-like end plate 110 of the scroll, and finally, the third cutter 50 machine the second side surface 110b of the disc-like end plate 210 of the scroll 100. However, machining sequences of the present invention are not limited to the foregoing embodiments, and each machining sequence can be changed according to an actual machining process.

Embodiments Related to Machining an Orbiting Scroll

Figure 9:
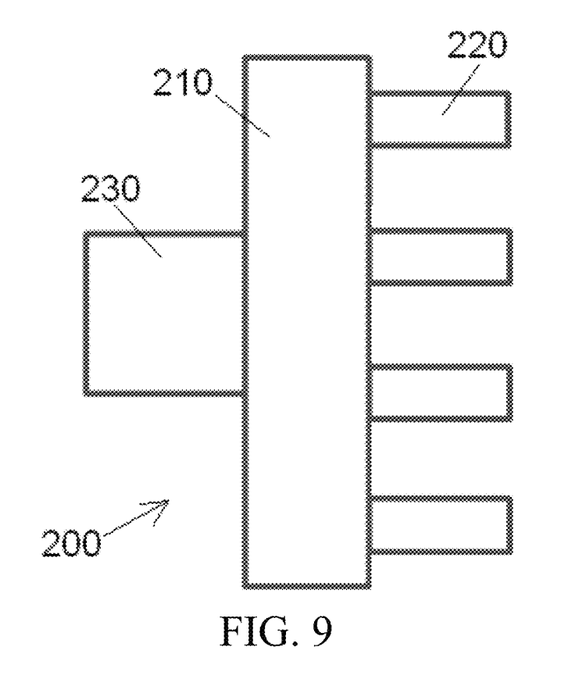
FIG. 9 is a schematic side view of an orbiting scroll according to an exemplary embodiment of the present invention.

FIG. 9 is a schematic side view of an orbiting scroll 200 according to an exemplary embodiment of the present invention.

As shown in FIG. 9, in the schematic embodiment, the orbiting scroll 200 has a disc-like end plate 210, a scroll wall 220 extending from a first side surface of the disc-like end plate 210 and a hub part 230 extending from a second side surface of the disc-like end plate 210.

A process of machining the orbiting scroll 200 is described in detail with reference to FIGS. 9-14.

As shown in FIG. 9, the orbiting scroll 200 is a workpiece to be machined.

Figure 10:
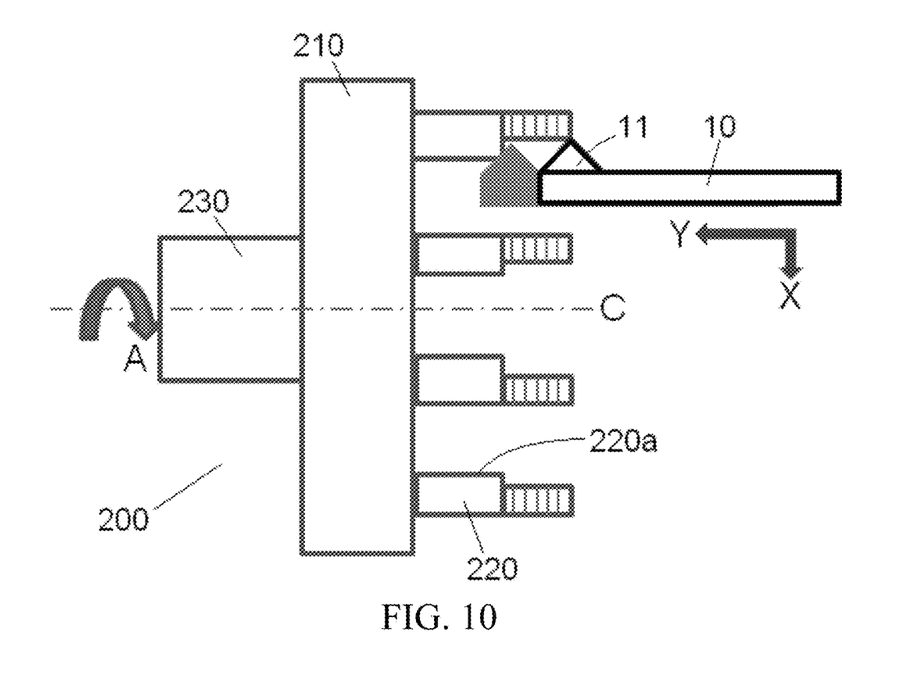
FIG. 10 is a schematic diagram showing the orbiting scroll as shown in FIG. 9 which is clamped by a clamp and which is driven to rotate, and showing machining a side wall surface of a scroll wall of the orbiting scroll by using a first cutter while the orbiting scroll rotates.

As shown in FIG. 10, a clamp (not shown) is used to clamp the orbiting scroll 200. In an embodiment, the clamp may directly clamp the hub part 230 of the orbiting scroll 200. Thus, as shown in FIG. 10, the orbiting scroll 200 is driven by the clamp to rotate around a center axis C of the orbiting scroll 200.

Other clamping manners may be adopted to clamp the orbiting scroll besides the above manner of clamping an outer diameter of the hub part 230, for example, the orbiting scroll can be clamped by adopting an inner support or by using jaws.

As shown in FIG. 10, while the orbiting scroll 200 is rotating, a first cutter 10 machines a side wall surface 220a of a scroll wall 220 of the orbiting scroll 200. When machining the side wall surface 220a of the scroll wall 220, the first cutter 10 moves along a first direction Y parallel with the center axis C and along a second direction X which is vertical to the first direction Y and which is pointing to the center axis C. Specifically, the first cutter 10 moves forward a certain distance along the first direction Y each time when turning one circle along the scroll side wall, in order to turn the next layer of materials of the side wall surface 220a.

Figure 13:
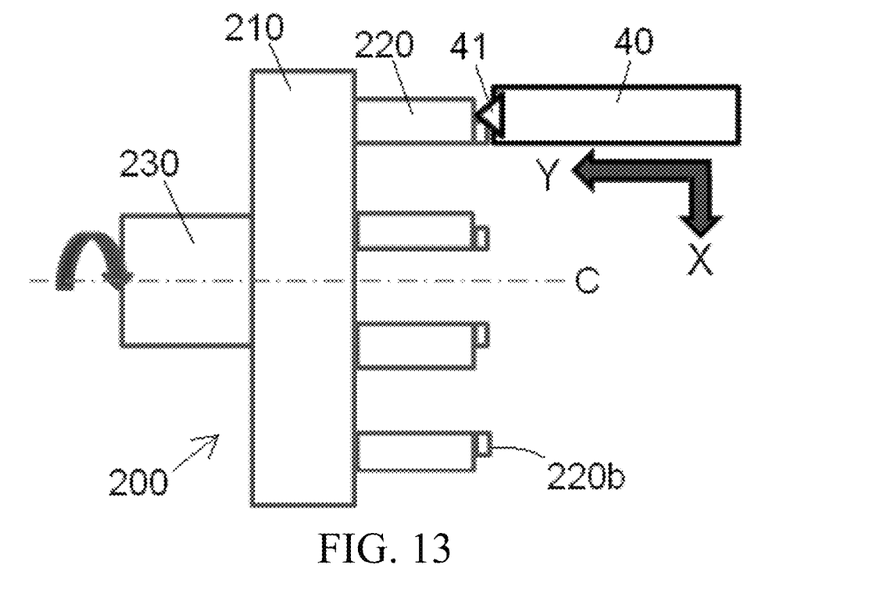
FIG. 13 is a schematic diagram illustrating machining an end surface of a scroll wall of an orbiting scroll by using a second cutter.

Then, as shown in FIG. 13, when the orbiting scroll 200 is rotating, a second cutter 40 is adopted to machine an end surface 220b of the scroll wall 220 and a first side surface of the disc-like end plate 210 of the scroll. When the end surface 220b of the scroll wall 220 and the first side surface of the disc-like end plate 210 of the scroll are machined, the second cutter 40 moves along a first direction Y parallel with the center axis C and a second direction X vertical to the first direction Y and pointing to the center axis C.

Figure 14:
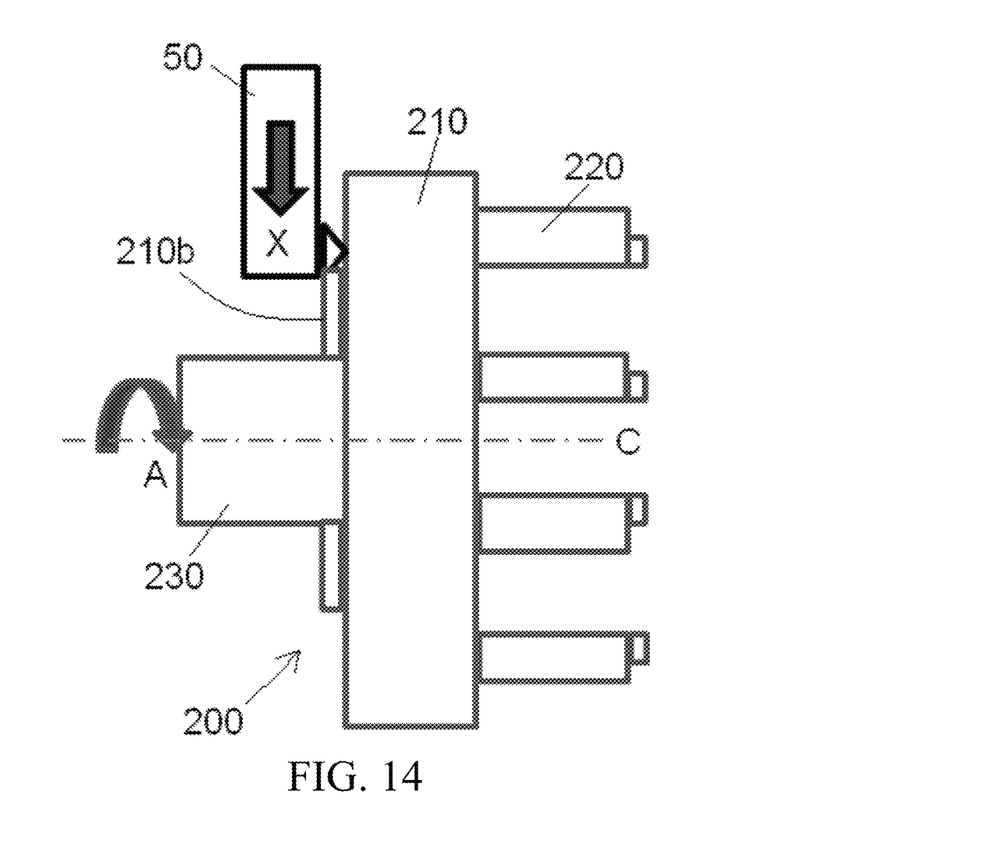
FIG. 14 is a schematic diagram of machining a back surface and a hub part of a disc-like end plate of an orbiting scroll by using a third cutter.

Finally, as shown in FIG. 14, when the orbiting scroll 200 is rotating, a third cutter 50 is used for machining a second side surface 210b of the disc-like end plate 210 and a peripheral surface of the hub part 230. When the second side surface 210b of the disc-like end plate 210 is machined, the third cutter 50 moves along a second direction X vertical to a first direction Y and pointing to the center axis C. When the peripheral surface of the hub part 230 is machined, the third cutter 50 moves along the first direction Y parallel with the center axis C.

As shown in FIG. 10, the first cutter 10 only has one blade 11 in the foregoing schematic embodiment. However, the present invention is not limited to the foregoing schematic embodiment.

Figure 11:
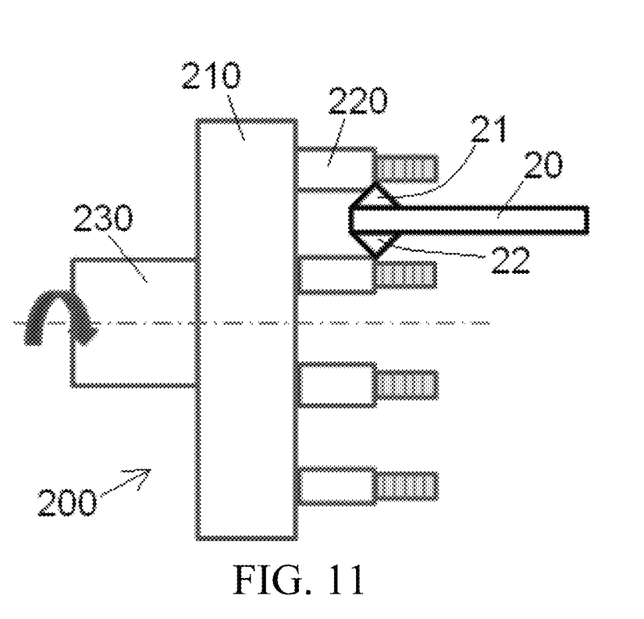
FIG. 11 is a schematic diagram illustrating machining a side wall surface of a scroll wall of an orbiting scroll by using a variant of the first cutter while the fixed scroll rotates.

FIG. 11 shows a variant of a first cutter, a first cutter 20. As shown in FIG. 11, the first cutter 20 has a pair of blades 21 and 22, which are arranged in a back-to-back manner. Thus, opposite side wall surfaces 220a of the scroll wall 220 can be simultaneously machined by the pair of blades 21 and 22, thereby improving machining efficiency.

Figure 12:
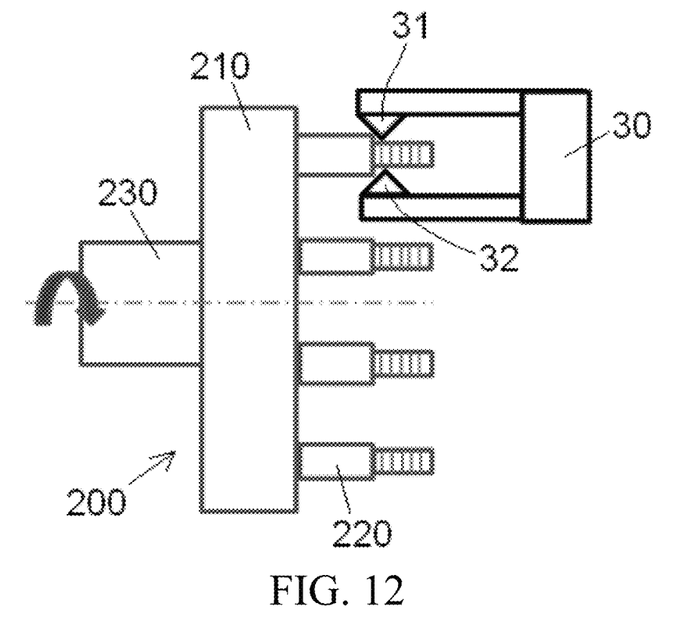
FIG. 12 is a schematic diagram illustrating machining a side wall surface of a scroll wall of an orbiting scroll by using another variant of the first cutter while the fixed scroll rotates.

FIG. 12 shows another variant of a first cutter, first cutter 30. As shown in FIG. 12, the first cutter 30 has a pair of blades 31 and 32 facing each other. Thus, the pair of blades 31 and 32 can be used for simultaneously machining two side wall surfaces 220a of the same scroll wall 220, thereby improving the machining efficiency.

In an embodiment of the present invention, the foregoing first cutters 10, 20 and 30 may be a turning cutter with a standard cutter bit.

In an embodiment of the present invention, the second cutter 40 may be a turning cutter or a milling cutter.

In an embodiment of the present invention, the third cutter 50 is a turning cutter and may be different from the first cutters 10, 20 and 30.

In an embodiment of the present invention, in a whole process of machining the orbiting scroll 200, the orbiting scroll 200 is always mounted and fixed on the same clamp. Therefore, in the whole machining process, it is not necessary to mount and fix the orbiting scroll 200 again, while only a machining cutter need be replaced and moved, thereby further improving the machining efficiency.

In an embodiment of the present invention, a numerical control machine tool can be adopted in the machine of the orbiting scroll 200, thereby further improving a machining precision and the machining efficiency.

In foregoing embodiments, the scroll is driven by the clamp to rotate around a center axis of the scroll while the first cutter 10 does not rotate around an axis of the first cutter during a scroll machining process, that is, in each embodiment of the present invention, the first cutter 10 is a non-rotary cutter.

In addition, in the schematic embodiment, the first cutter 10 does not rotate around a center axis C of the scroll 200, thus simplifying the control of the first cutter 10 and improving the machining precision and machining efficiency. In foregoing embodiments of the present invention, the first cutter 10 firstly machines the side wall surface 220a of the scroll wall 220 of the scroll 200, then the second cutter 40 machines the end surface 220b of the scroll wall 220 of the scroll 200 and a first side surface of the disc-like end plate 210 of the scroll 200, and finally, the third cutter 50 is adopted to machine the second side surface 210b of the disc-like end plate 210 of the scroll 200 and the peripheral surface 230 of the hub part 230. However, machining sequences of the present invention are not limited to the foregoing embodiments, and the machining steps can be changed.

Embodiments of Scroll Machining Apparatus

An embodiment of the present invention describes a scroll machining apparatus for machining the foregoing scrolls 100 and 200. The scroll machining apparatus mainly includes a clamp, a first cutter 10 and a control unit. The clamp is operable for fixing the scrolls 100 and 200 to be machined and operable for driving the scrolls 100 and 200 to rotate around a center axis C of the scroll 100 or 200. The scroll 100 has a disc-like end plate 110 and a scroll wall 120 extending from a first side surface of the disc-like end plate 110. Similarly, the scroll 200 also has a disc-like end plate 210 and a scroll wall 220 extending from a first side surface of the disc-like end plate 210. The first cutter 10 is operable for machining a side wall surface 120a of the scroll wall 120 while the scroll 100 rotates, and is also operable for machining a side wall surface 220a of the scroll wall 220 while the scroll 200 rotates. The first cutter 10 is a non-rotary cutter. The forgoing control unit is operable for controlling the first cutter to machine the respective side wall surfaces 120a and 220a of the scroll walls 120 and 220 of the scrolls 100 and 200.

In an embodiment of the present invention, the forgoing scroll machining apparatus may further include a second cutter 40. The second cutter 40 is operable for machining an end surface 120b of the scroll wall 120 and a first side surface of the scroll 110 while the scroll 100 rotates; and the second cutter 40 may also be operable for machining an end surface 220b of the scroll wall 210 and a first side surface of the scroll 210 while the scroll 210 rotates. The control unit is operable for switching the first cutter to the second cutter and controlling the second cutter to machine the respective end surfaces 120b and 220b of the scroll walls 120 and 220 and respective first side surfaces of the scrolls.

In an embodiment of the present invention, the forgoing scroll machining apparatus may further include a third cutter 50. The third cutter 50 is operable for machining a second side surface 210b of the disc-like end plate 210 of the scroll 200 and/or a peripheral surface of the hub part 230 of the scroll 200. Besides, the third cutter 50 may also be operable for machining a second side surface 110b of the disc-like end plate 110 of the scroll 100. The control unit can be operable for switching the second cutter to the third cutter, and controlling the third cutter to machine the second side surface 210b of the disc-like end plate 210 of the scroll 200 and/or the peripheral surface of the hub part 230 of the scroll 200, and to machine the second side surface 110b of the disc-like end plate 110 of the scroll 100.

In an embodiment of the present invention, the foregoing scroll machining apparatus is a numerical control machine tool.

Those skilled in the art can understand that the foregoing embodiments are exemplary, and those skilled in the art can modify the embodiments, and structures described in various embodiments can be combined only if there are no conflicts on structure or principle aspects with the forgoing embodiments.

Although the present invention is described with reference to the drawings, the embodiments disclosed in the drawings aim to exemplarily describe the preferable embodiments of the present invention rather than limiting the present invention.

Although some embodiments of a total inventive concept of the present invention are displayed and described, those ordinary skilled in the art will understand that those embodiments can be changed without departing from the principle and spirit of the total inventive concept of the present invention, and a scope of the present invention is defined by claims and equivalents thereof.

It should be noted that the term "comprises" does not exclude other elements or steps, and terms "one" or "a" does not exclude more. In addition, any element number of the claims should not be understood as limitation to the scope of the present invention.

What is claimed is:

1. A method for machining a scroll in a machining process, wherein the scroll comprises a disc-like end plate and a scroll wall extending from a first side surface of the disc-like end plate, and wherein the method comprises:
    machining a side wall surface of the scroll wall by a first cutter when the scroll is driven to rotate around a center axis of the scroll, the first cutter being a non-rotary cutter,
    wherein during at least a part of the machining process, the first cutter moves along a first direction parallel with the center axis while cutting material from the side wall surface of the scroll wall and along a second direction vertical to the first direction and pointing to the center axis while cutting material from the side wall surface of the scroll wall.

2. The method according to claim 1, wherein the scroll is clamped on a clamp, and is driven to rotate by rotation of the clamp.

3. The method according to claim 2, wherein the scroll is a fixed scroll.

4. The method according to claim 3, wherein
    the clamp clamps a peripheral surface of the disc-like end plate of the fixed scroll.

5. The method according to claim 2, wherein,
    the scroll is an orbiting scroll; and
    the orbiting scroll further comprises a hub part extending from a second side surface of the disc-like end plate.

6. The method according to claim 5, wherein,
    the clamp clamps the hub part of the orbiting scroll.

7. The method according to claim 1, wherein,
    the first cutter has one blade.

8. The method according to claim 1, wherein,
    the first cutter has a pair of blades which are arranged in a back-to-back manner.

9. The method according to claim 8, wherein,
    side wall surfaces of the scroll wall are simultaneously machined by the pair of blades when the scroll wall of the scroll is machined, the side wall surfaces being surfaces facing each other in the scroll.

10. The method according to claim 1, wherein,
    the first cutter has a pair of blades facing each other.

11. The method according to claim 10, wherein,
    two side wall surfaces of the same scroll wall are machined simultaneously by the pair of blades when the scroll wall of the scroll is machined.

12. The method according to claim 1, further comprising:
    after the side wall surface of the scroll wall is machined, machining, by a second cutter, an end surface of the scroll wall and/or a first side surface of the disc-like end plate of the scroll while the scroll is rotating.

13. The method according to claim 12, wherein
    the second cutter moves along a first direction parallel with the center axis and along a second direction vertical to the first direction and pointing to the center axis.

14. The method according to claim 1, wherein the first cutter is a turning cutter.

15. The method according to claim 12, wherein the second cutter is a turning cutter or a milling cutter.

16. The method according to claim 12, wherein,
    the scroll is a fixed scroll;
    the method further comprises:
    machining, by a third cutter after the end surface of the scroll wall is machined, a second side surface of the disc-like end plate while the scroll is rotating.

17. The method according to claim 16, wherein
    the third cutter moves along a second direction which is vertical to a first direction parallel with the center axis and which is pointing to the center axis.

18. The method according to claim 12, wherein,
    the scroll is an orbiting scroll, and the orbiting scroll further comprises a hub part extending from the second side surface of the disc-like end plate;
    the method further comprises:
    machining, by a third cutter after the end surface of the scroll wall is machined, the second side surface of the disc-like end plate and a peripheral surface of the hub part while the scroll is rotating.

19. The method according to claim 18, wherein,
    the third cutter moves along a second direction which is vertical to a first direction parallel with the center axis and which is pointing to the center axis.

20. The method according to claim 17, wherein,
    the third cutter is a turning cutter.

21. The method according to claim 16, wherein,
    the scroll are mounted and fixed on a same clamp always during a whole process of machining the scroll.

* * * * *